April 29, 1952     K. D. BAILEY     2,594,274
MODULATION METER
Filed May 28, 1951
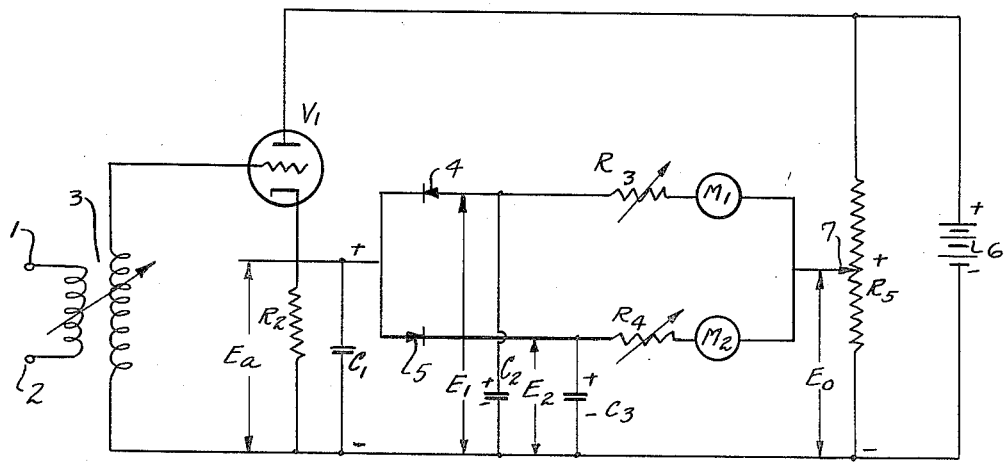
_Fig. 1_
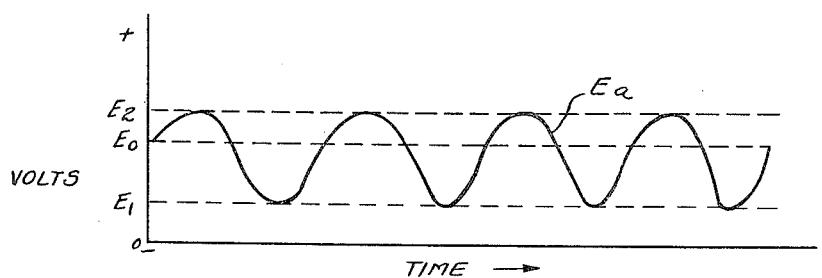
_Fig. 2_
INVENTOR.
KENNETH D. BAILEY Patented Apr. 29, 1952

2,594,274

UNITED STATES PATENT OFFICE 2,594,274

MODULATION METER

Kenneth D. Bailey, Dayton, Ohio

Application May 28, 1951, Serial No. 228,726

3 Claims. (Cl. 332—39)

(Granted under the act of March 3, 1883, as amended April 30, 1928; 370 O. G. 757)

The invention described herein may be manufactured and used by or for the United States Government for governmental purposes without payment to me of any royalty thereon.

It is the object of this invention to provide a metering device for giving a continuous and simultaneous indication of both the degree of positive modulation and the degree of negative modulation of an amplitude modulated radio frequency carrier wave.

Briefly, the modulation meter comprises means for converting an amplitude modulated radio frequency wave into a correspondingly modulated direct voltage which is applied to a pair of condensers through oppositely poled rectifiers. A voltmeter is connected to measure the difference in potential between each of the condensers and a fixed potential equal to the voltage developed across the condensers by the unmodulated carrier wave. The difference potentials measured by the voltmeters are indicative of the degrees of positive and negative modulation. With proper calibration these values may be read directly from the voltmeters.

The invention will be more fully explained in connection with the specific embodiment thereof shown in the accompanying drawings, in which Fig. 1 is a schematic diagram of the modulation meter, and Fig. 2 is a graph illustrating the operation of Fig. 1.

Referring to Fig. 1 the modulated carrier wave to be metered is applied to input terminals 1—2 and through variable inductive coupler 3 to the input circuit of cathode follower stage $V_1$. Any suitable radio frequency amplitude controlling device may be used in place of the variable coupler 3 which is shown only by way of example. The output network $R_2$—$C_1$ of the cathode follower stage is located in the cathode circuit of the tube and is included in both the input and output circuits of the stage. The time constant of the circuit $R_2$—$C_1$ is chosen to be long relative to the period of the radio frequency but short relative to the period of the modulation so that the direct voltage $E_a$ developed across the circuit is very nearly equal to the peak radio frequency amplitude at the instant. The amplitude of the direct voltage $E_a$ therefore follows the modulation envelope of the carrier wave.

Condenser $C_2$ is connected in series with rectifier 4 across network $R_2$—$C_1$ and condenser $C_3$ is connected in series with rectifier 5 across this network. Resistor $R_5$, across voltage source 6, and tap 7 thereon provide a voltage $E_0$ which is connected in series with voltmeter $M_2$ and resistor $R_4$ across condenser $C_3$. The voltage $E_0$ is also connected in series with meter $M_1$ and resistor $R_3$ across condenser $C_2$.

Condenser $C_3$ can be charged very quickly by voltage $E_a$ through rectifier 5. Condenser $C_3$, however, can not discharge at all through rectifier 5 and only very slowly through resistor $R_4$ and the high resistance of voltmeter $M_2$. Therefore, condenser $C_3$ charges to a voltage $E_2$ substantially equal to the maximum value of $E_a$.

Condenser $C_2$ can not charge through rectifier 4 and can charge only very slowly through $R_3$ and the high resistance of voltmeter $M_1$. However, condenser $C_2$ can discharge readily through rectifier 4 when $E_a$ is less than $E_1$. Therefore the voltage $E_1$ assumes a value substantially equal to the minimum value of $E_a$.

The various voltages are shown graphically in Fig. 2. The percentage positive modulation P and the percentage negative modulation N are given by the expressions $$P = \frac{E_2 - E_0}{E_0} \times 100$$

and $$N = \frac{E_0 - E_1}{E_0} \times 100$$

Since meters $M_1$ and $M_2$ indicate the voltages ($E_0 - E_1$) and ($E_2 - E_0$), respectively, these meters may be supplied with scales reading percentage negative and positive modulation directly. Adjustable tap 7 and resistors $R_3$ and $R_4$ provide variables for calibrating the meters.

To initially adjust the modulation meter the unmodulated carrier is applied to input terminals 1—2 and its amplitude adjusted by variable coupling device 3 until the meters $M_1$ and $M_2$ read zero, or, in other words, the amplitude of the unmodulated carrier is adjusted until $E_a = E_0$. When modulation is applied to the carrier $C_3$ will quickly charge to $E_2$ and condenser $C_2$ will quickly discharge to $E_1$. Meters $M_1$ and $M_2$ will then give a continuous indication of the degree of negative and positive modulation.

I claim:

1. A meter for simultaneously and continuously indicating the degree of positive and negative modulation of an amplitude modulated radio frequency wave, said meter comprising means for producing from said amplitude modulated radio frequency wave a correspondingly amplitude modulated direct voltage, a first series circuit consisting of said modulated direct voltage, a first condenser and a first rectifier poled to permit charging of said first condenser by said voltage; a second series circuit consisting of said modulated direct voltage, a second condenser and a second rectifier poled to prevent charging of said second condenser by said voltage, a source of fixed direct voltage; high resistance means for measuring the difference between the voltage of said first condenser and said fixed voltage; high resistance means for measuring the difference between the voltage of said second condenser and said fixed voltage; and means for adjusting the amplitude of said radio frequency wave for the purpose of adjusting the amplitude of said first mentioned direct voltage to equality with the amplitude of said fixed direct voltage in the absence of modulation on said radio frequency wave.

2. A meter for simultaneously and continuously indicating the degree of positive and negative modulation of an amplitude modulated radio frequency wave, said meter comprising converting means having input and output terminals for converting a radio frequency wave applied to its input terminals into a direct voltage at its output terminals having an amplitude proportional to the instantaneous peak amplitude of said radio frequency wave; a first series circuit consisting of said output terminals, a first condenser and a first rectifier poled to permit charging of said first condenser by said direct voltage; a second series circuit consisting of said output terminals, a second condenser and a second rectifier poled to prevent charging of said second condenser by said direct voltage; a source of fixed direct voltage; a third series circuit comprising said first condenser, said source of fixed voltage and means for measuring the difference between the voltage across said first condenser and said source of fixed voltage, said third series circuit having a time constant long as compared to the modulation period; a fourth series circuit comprising said second condenser, said source of fixed voltage and means for measuring the difference between the voltage across said second condenser and said fixed voltage, said fourth series circuit having a time constant long as compared to the modulation period; means for applying an amplitude modulated radio frequency wave to the input terminals of said converting means; and means for adjusting the amplitude of said radio frequency wave.

3. A meter for simultaneously and continuously indicating the degree of positive and negative modulation of an amplitude modulated radio frequency wave, said meter comprising means for converting said amplitude modulated radio frequency wave into a correspondingly amplitude modulated direct voltage, a source of fixed direct voltage, means for indicating the difference between the maximum value of said modulated direct voltage and said fixed voltage, means for indicating the difference between the minimum value of said modulated direct voltage and said fixed voltage, and means for adjusting the amplitude of the direct voltage produced by said converting means when the modulation of said radio frequency wave is zero to equality with said fixed voltage.

KENNETH D. BAILEY.

REFERENCES CITED

The following references are of record in the file of this patent:

UNITED STATES PATENTS

| Number | Name | Date |
|---|---|---|
| 2,069,934 | Arguimban | Feb. 9, 1937 |